US012612532B2

(12) United States Patent
Tenhaeff et al.

(10) Patent No.: US 12,612,532 B2
(45) Date of Patent: Apr. 28, 2026

(54) OPTICAL HALOGENATED POLYMER THIN FILM WITH ULTRA-HIGH REFRACTIVE INDEX

(71) Applicant: University of Rochester, Rochester, NY (US)

(72) Inventors: Wyatt Tenhaeff, Rochester, NY (US); Ni Huo, Rochester, NY (US)

(73) Assignee: University of Rochester, Rochester, NY (US)

( * ) Notice: Subject to any disclaimer, the term of this patent is extended or adjusted under 35 U.S.C. 154(b) by 221 days.

(21) Appl. No.: 18/211,474

(22) Filed: Jun. 19, 2023

(65) Prior Publication Data

US 2023/0383137 A1     Nov. 30, 2023

Related U.S. Application Data

(63) Continuation-in-part of application No. 17/856,577, filed on Jul. 1, 2022.

(60) Provisional application No. 63/219,200, filed on Jul. 7, 2021.

(51) Int. Cl.
*C09D 139/08* (2006.01)
*C08G 64/26* (2006.01)

(52) U.S. Cl.
CPC ........... *C09D 139/08* (2013.01); *C08G 64/26* (2013.01); *Y10T 428/26* (2015.01)

(58) Field of Classification Search
CPC ...... C09D 139/08; C08G 64/26; Y10T 428/26
See application file for complete search history.

(56) References Cited

U.S. PATENT DOCUMENTS

2009/0081152 A1* 3/2009 Chuang .................. A01N 55/00
                                                              526/265

OTHER PUBLICATIONS

[NPL-1] Huo et al.; "Synthesis of High Refractive Index Polymer Thin Films for Soft, Flexible Optics Through Halomethane Quaterniza-tion of Poly(4-Vinylpyridine)"; Advanced Optical Materials, vol. 12, Iss. 10; Apr. 4, 2024. (Year: 2024).*
[NPL-2] "Halocarbon"; Wikipedia (accessed Jul. 23, 2025); <https://en.wikipedia.org/wiki/Halocarbon>. (Year: 2025).*
Higashihara T. and Ueda M., Recent Progress in High Refractive Index Polymers, Macromolecules 2015, 48, 1915-1929 (DOI:10. 1021/ma502569r).
Qi Y, Ding J, Day M, Jiang J, and Callender C, Cross-linkable highly halogenated poly(arylene ether ketone/sulfone)s with tunable refractive index: Synthesis, characterization and optical properties, Polymer 47(2006) 8263-8271 (doi:10.1016/j.polymer.2006.09. 065).

* cited by examiner

*Primary Examiner* — Donald M Flores, Jr.
(74) *Attorney, Agent, or Firm* — Wissing Miller LLP

(57)     ABSTRACT

A high refractive index optical coating made by forming a solid thin layer of a polymer such as P4VP by a process such as iCVD and quaternizing and halogenating the solid layer with vaporized $CH_2I_2$, $CH_3I$, and/or $CH_2Br_2$ to thereby form a resulting film that has a greatly increased refractive index and other desirable optical and other properties.

29 Claims, 11 Drawing Sheets

Step 1: Initiated chemical vapor deposition (iCVD)

Step2: Halogen compound vapor treatment

OPTICAL HALOGENATED POLYMER THIN FILM WITH ULTRA-HIGH REFRACTIVE INDEX

REFERENCE TO RELATED APPLICATION

This application is a continuation in-part of parent patent application Ser. No. 17/856,577 filed Jul. 1, 2022, which claims the benefit of U.S. Provisional Patent Application No. 63/219,200 filed on Jul. 7, 2021. This patent specification incorporates by reference the foregoing patent applications.

This invention was made with government support under CBET-1845805 awarded by the National Science Foundation. The government has certain rights in the invention.

FIELD

This patent specification relates to high refractive index films and more specifically to films of this type that have desirable combinations of optical and physical properties.

BACKGROUND

High refractive index polymers (HRIP) are an important class of materials with actual or potential applications in optics and optoelectronic devices such as anti-reflective coatings, LED encapsulants, microlenses for CMOS sensors, metalenses, artificial cornea implants, and components for displays. With the increasing popularity of wearable devices and flexible displays, there is a growing demand for the development of HRIP thin films and coatings. However, achieving polymer films with high refractive index (RI) while maintaining high homogeneity and good thermal stability and other desirable properties is a significant challenge. Large polarizable halogen atoms, such as atomic iodine with a molar refractivity of 13.90 $cm^3$ $mol^{-1}$, offer potential as components in the development of HRIPs. Some of the desirable properties of such films and coatings are high refractive index, good manufacturability and low cost, high transmission at least at selected wavelengths, and resistance to physical damage. As discussed in Higashihara T. and Ueda M., *Recent Progress in High Refractive Index Polymers*, Macromolecules 2015, 48, 1915-1929 (DOI: 10.1021/ma502569r), which is hereby incorporated by reference in this patent specification, "a very high-n exceeding 1.7 and even 1.8 is frequently desired." The article discusses the use of multi-layer films, for example as seen in FIG. 6 thereof, and on page 1922 refers to a three-layer polymer coating in which a layer has a titania content of 50 wt % and refractive index n=1.86. Another publication discusses halogenated polymers with a refractive index that can be adjusted within a range from 1.51 to 1.57. See Qi Y, Ding J, Day M, Jiang J, and Callender C, *Cross-linkable highly halogenated poly(arylene ether ketone/sulfone)s with tunable refractive index: Synthesis, characterization and optical properties*, Polymer 47(2006) 8263-8271 (doi:10.1016/ j.polymer.2006.09.065), hereby incorporated by reference in this patent specification. It would be desirable to develop polymer coatings with better optical and physical properties that are more easily manufacturable and are less expensive. The subject matter described or claimed in this patent specification is not limited to embodiments that solve any specific disadvantages or that operate only in environments such as those described above. Rather, the above background is only provided to illustrate one exemplary technology area where some embodiments described herein may be practiced.

SUMMARY

The summary below reflects the initially claimed subject matter, which can evolve in prosecution of this patent application.

According to some embodiments, a coating comprises: a polymer film formed of poly(4-vinylpyridine) (P4VP) and thereafter quaternized and halogenated at elevated temperature with one or more of vaporized $CH_2I_2$, $CH_3I$, and $CH_2Br_2$ to form a resulting film of one or more of P4VP-$CH_2I_2$, P4VP-$CH_3I$, and P4VP-$CH_2Br_2$, wherein said resulting film: exhibits a refractive index of 1.7 or more for wavelengths in the 400-800 nm range; and has thickness in the 10-2000 nm range.

According to some embodiments, the resulting film further includes one or more of the following: (a) the extinction coefficient of the resulting film is steady in the wavelength range of 650-800 nm and is less than 0.05, or is less than 0.001; (b) the refractive index of the resulting film peaks at more than 2.2 and is at 2.0 or more in the 400-800 nm wavelength range, or peaks at over 1.80 and is at or over 1.68 over the wavelength range of 400-800 nm, or peaks at over 1.74 and is at or over 1.65 over the wavelength range of 400-800 nm; (c) the resulting films retain more than 99%, or 99%, or 97% of their index of refraction after being heated to 200° C.; (d) the resulting film retain over 96% of their thickness after being heated to 200° C.; (e) the resulting film thickness is in the range of 10-800 nm; and (f) the resulting film exhibits superior flexibility and stretchability under 3% and 10% strain compared to $Al_2O_3$ and $Ta_2O_5$ thin films of equivalent thickness.

According to some embodiments, a process of making a film having a selected refractive index comprises: first forming a layer comprising a polymer; introducing one or more of $CH_2I_2$, $CH_3I$, and $CH_2Br_2$ into the layer after the layer has been formed to thereby form a resulting film that exhibits: refractive index of 1.68 or more for wavelengths in the 400-800 nm range; and film thickness in the 10-1000 nm range.

According to some embodiments, the process further includes forming the resulting film with one or more of the following: (a) the extinction coefficient of the resulting film is steady in the wavelength range of 650-800 nm and is less than 0.05, or is less than 0.001; (b) the refractive index of the resulting film peaks at more than 2.2 and is at 2.0 or more in the 400-800 nm wavelength range, or peaks at over 1.80 and is at or over 1.68 over the wavelength range of 400-800 nm, or peaks at over 1.74 and is at or over 1.65 over the wavelength range of 400-800 nm; (c) the resulting film exhibits a refraction index retention ratio exceeding 99%, or 99%, or 97%; (d) the resulting film exhibits a thickness retention ratio exceeding 96%; (e) the resulting film thickness is in the range of 10-500 nm or is less than 200 nm; and (f) the resulting film exhibits enhanced flexibility and stretchability under 3% and 10% strain compared to $Al_2O_3$ and $Ta_2O_5$ thin films of equivalent thickness.

According to some embodiments, a process of making a film having a selected refractive index comprises: first forming a layer comprising a polymer containing chemical moieties reactive toward haloalkanes or halocarbons; and thereafter quaternizing and halogenating the layer by introducing therein one or more halogenating agents that form a stable compound thereby resulting in a film that exhibits refractive index of 1.68 or more for wavelengths in the 400-800 nm range; and film thickness in the 10-1000 nm range.

According to some embodiments, the process described in the immediately preceding paragraph can comprise using as said polymer one or more of poly(4-vinylpyridine) (P4VP), poly(2-vinylpyridine) (P2VP), poly(1-vinylimidazole), poly (vinyl pyrrolidone) (PVP), poly(vinylamine) (PVA), poly (ethyleneimine) (PEI), poly(dimethylaminoethyl acrylate), poly(dimethylaminoethyl methacrylate), poly(acrylamide) (PAAm) and poly(methacrylamide), and copolymers thereof. The halogenating agents used in the process can comprise haloalkanes. The haloalkanes or alkyl halides used in the process can comprise one or more of bromoethane, bromobutane, dibromobutane, iodoethane, iodobutane, diiodobutane. The halogenating agents used in the process can comprise halocarbons.

BRIEF DESCRIPTION OF THE DRAWINGS

To further clarify the above and other advantages and features of the subject matter of this patent specification, specific examples of embodiments are illustrated in the appended drawings. It should be appreciated that these drawings depict only illustrative examples and are therefore not to be considered limiting of the scope of this patent specification or the appended claims. The subject matter hereof will be described and explained with additional specificity and detail using the accompanying drawings in which:

FIG. 2A illustrates reactions involving vapor treatment of P4VP with $CH_3I$, according to some embodiments.

FIG. 2B illustrates reactions involving vapor treatment of P4VP with $CH_2I_2$ or $CH_2Br_2$, according to some embodiments.

DETAILED DESCRIPTION

A detailed description of examples of preferred embodiments is provided below. While several embodiments are described, the new subject matter described in this patent specification is not limited to any one embodiment or combination of embodiments described herein, but instead encompasses numerous alternatives, modifications, and equivalents. In addition, while numerous specific details are set forth in the following description to provide a thorough understanding, some embodiments can be practiced without some or all these details. Moreover, for the purpose of clarity, certain technical material that is known in the related art has not been described in detail to avoid unnecessarily obscuring the new subject matter described herein. It should be clear that individual features of one or several of the specific embodiments described herein can be used in combination with features of other described embodiments or with other features. Like reference numbers and designations in the various drawings indicate like elements.

Typical commodity polymers are believed to possess refractive index (RI) in the range 1.3-1.7. Obtaining polymers with greater RI while maintaining high optical transparency and other desirable properties is an important challenge. Halogen atoms such as chlorine, bromine, and iodine have high atomic refractivity ranging from 5.97 to 13.90 $cm^3$ $mol^{-1}$ and can be useful components in the development of HRIPs (high refractive index polymers). As described in this patent specification, a series of halogenated polymer thin films with high refractive index and outstanding optical transparency in the visible range and other desirable characteristics, including good thermal stability, were prepared via initiated chemical vapor deposition (iCVD). This technique can fabricate a wide range of polymer coatings for many applications. In examples described in this patent specification, poly(4-vinylpyridine) (P4VP) films with thickness of, for example 100 nm, were prepared using iCVD, then quaternized and halogenated at elevated temperature with vaporized $CH_2I_2$, $CH_3I$, or $CH_2Br_2$, thus obtaining polymer thin films with high RI and other desirable properties.

Figure 1:
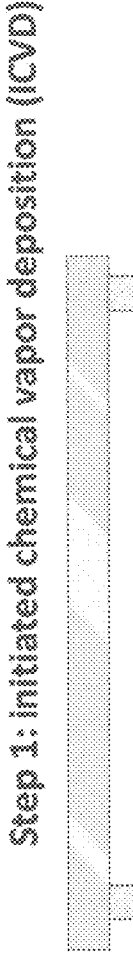
FIG. 1 schematically illustrates in step 1 fabrication of P4VP thin film using initiated chemical vapor deposition (iCVD) technique and in step 2, under elevated temperature, vaporization of (di)iodomethane ($CH_2I2$) that reacts with the P4VP thin firm, resulting in the formation of P4VP-$CH_2I_2$ high refraction resulting film or coating, according to some embodiments. The thickness of the resulting film is approximately 100 nm in some examples but can be in the range of 10-2000 nm, preferably is in the 10-500 nm range, and more preferably 200 nm or less.
Figure 1:
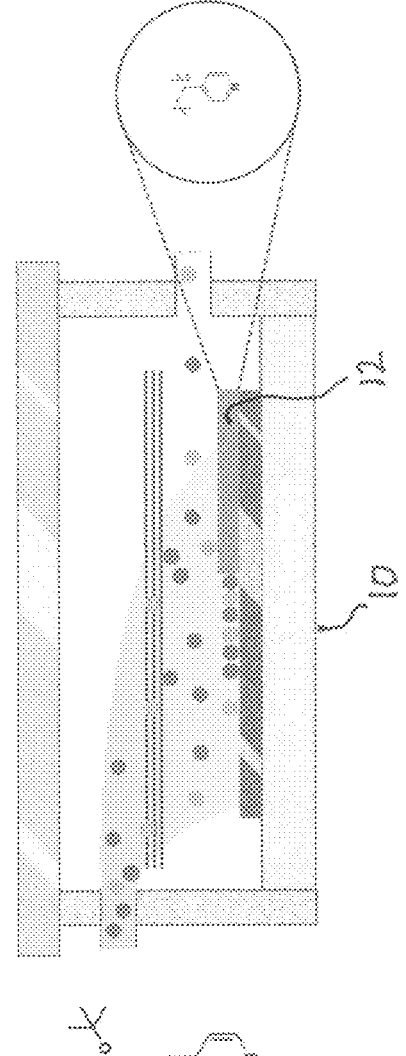
Figure 1:
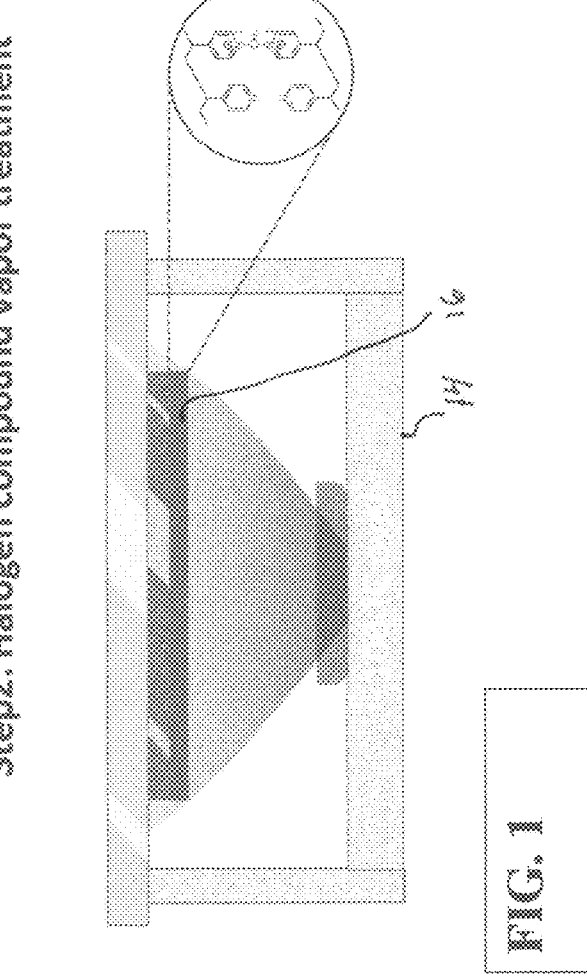

FIG. 1 schematically illustrates in step 1 fabrication of P4VP thin film 12 using initiated chemical vapor deposition (iCVD) technique in iCVD chamber 10 and in step 2, under elevated temperature such as 100° C. for example, vaporization of (di)iodomethane ($CH_2I_2$) that reacts with the P4VP thin film in oven 14, resulting in the formation of $P4VP-CH_2I_2$ high refraction film or coating 16, according to some embodiments. Under elevated temperature, the (di)iodomethane ($CH_2I_2$) vaporizes and reacts with the P4VP thin film 12, resulting in the formation of $P4VP-CH_2I_2$ film 16. The halogen compound vapor treatment can be applied to other forms of P4VP thin films, not limited to P4VP coatings prepared by the iCVD technique. There can be other ways to effect quaternization. The examples in this patent specification refer to vapor-based reactions but the desired reactions can be achieved using a solution.

Figures 2A, 2B:
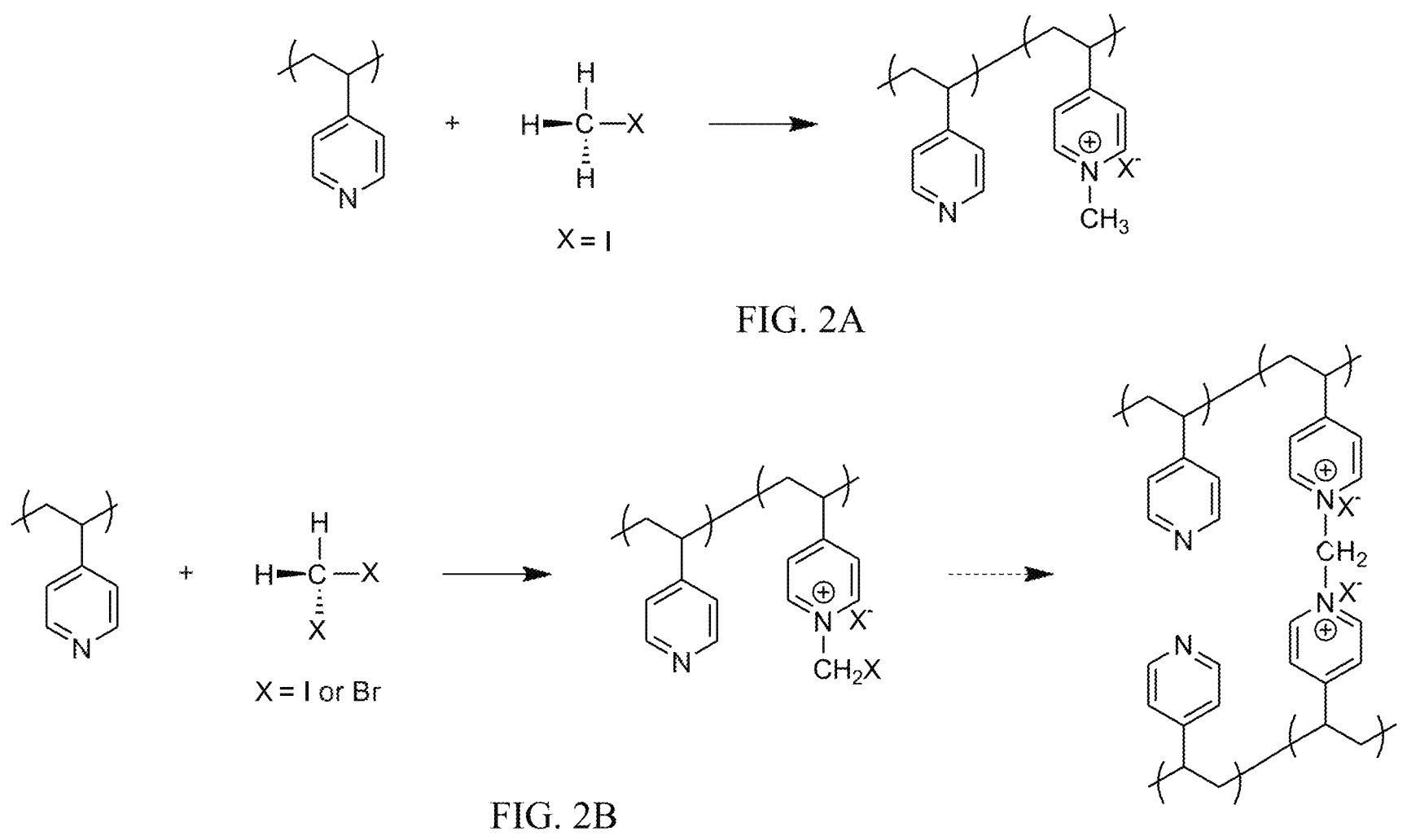

FIG. 2 illustrates reactions involving vapor treatment of P4VP with (1) $CH_3I$ and (2) $CH_2I_2$ or $CH_2Br_2$, according to some embodiments. Reaction (1) is between P4VP 20 and $CH_2I_2$ 22 and involves quaternization, where $CH_2I_2$ alkylates the pyridine nitrogen atoms of the polymer. This reaction (1) proceeds via a nucleophilic substitution mechanism and results in the formation of a positively charged quaternary n-alkyl pyridinium group, which is stabilized by the electron-withdrawing pyridine ring, resulting in a $P4VP-CH_2I_2$ film 24. Reaction (2) is between P4VP 20 and $CH_2I_2$ 26 or $CH_2Br_2$ 28 and results in the formation of the respective illustrated films 30, 32.

Figure 3:
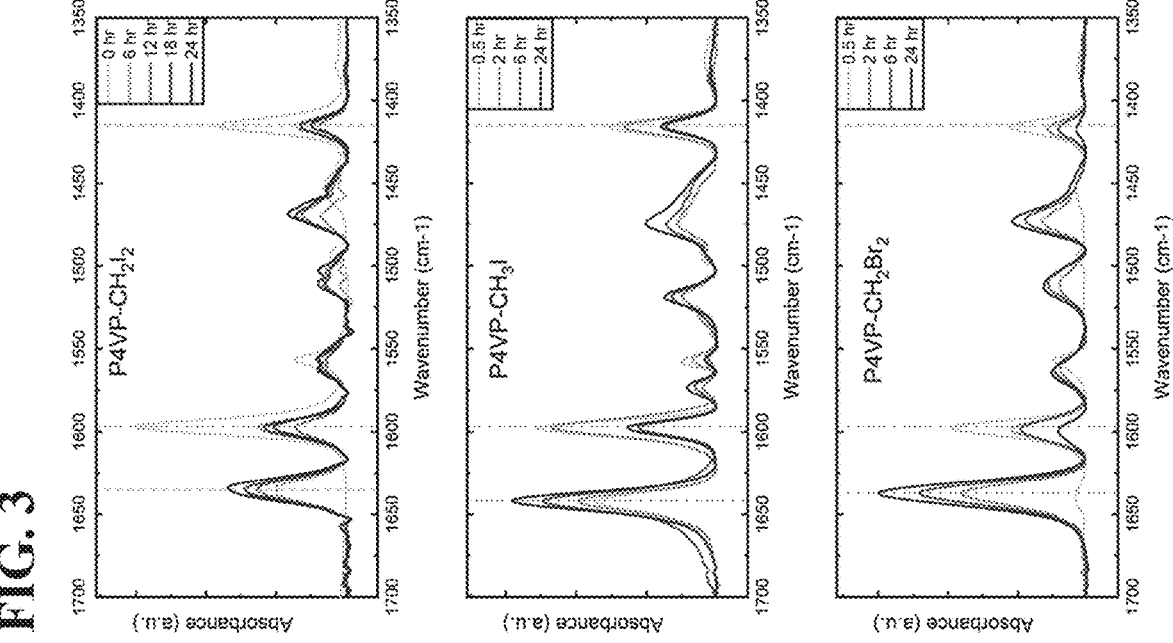
FIG. 3 provides FTIR spectra, plotting absorbance vs. wavenumber for varying halogen vapor treatment times of P4VP-$CH_2I_2$ in the upper panel, P4VP-$CH_3I$ in the middle panel, and P4VP-$CH_2Br_2$ in the bottom panel, according to some embodiments.

FIG. 3 illustrates selected region of the FTIR spectra, plotting infrared absorbance vs. wavenumber for varying halogen vapor treatment times of $P4VP-CH_{2I2}$ in the upper panel, $P4VP-CH_3I$ in the middle panel, and $P4VP-CH_2Br_2$ in the bottom panel, according to some embodiments. As seen in each panel, the respective curves represent absorbance (a.u.) vs. wavenumber ($cm^{-1}$) between 1700 and 1350 for halogenating time intervals of 0 hrs, 6 hrs, 12 hrs, 18 hrs, and 24 hrs. The absorption band at 1597 $cm^{-1}$ is attributed to a characteristic vibrations of the pyridine ring. In the $CH_2I_2$-treated P4VP, a new band emerges at 1635 $cm^{-1}$, which is assigned to the alkyl-pyridinium. The ratio of peak intensities at 1635 $cm^{-1}$ and 1597 $cm^{-1}$ increases with the iodine content, indicating a reaction between P4VP and $CH_2I_2$. Similar changes are observed in the spectra of $P4VP-CH_3I$ and $P4VP-CH_2Br_2$, which signifies reactions between P4VP and $CH_3I$, as well as $CH_2Br_2$.

Figure 4:
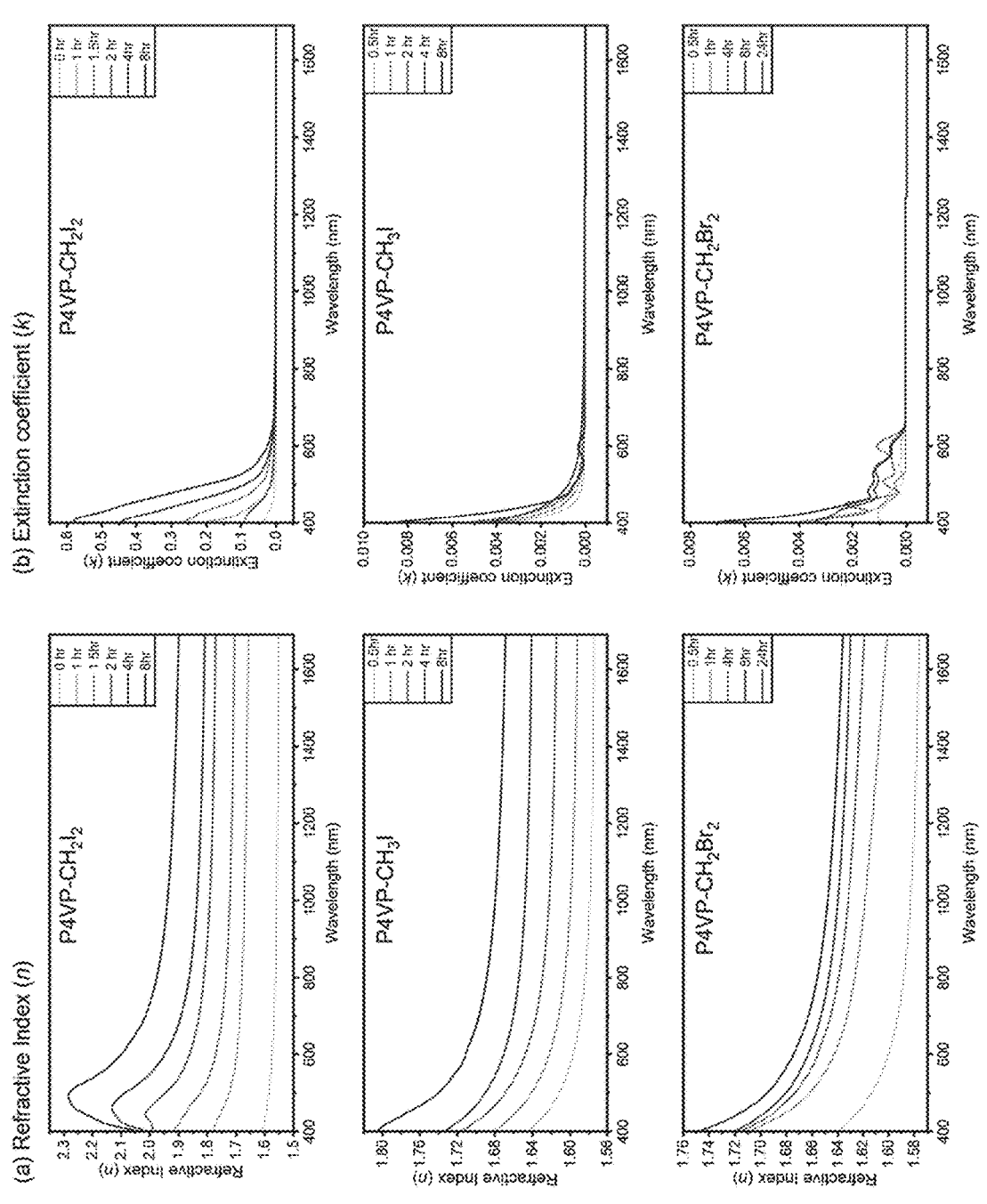
FIG. 4 illustrates refractive index spectra, refractive index vs. wavelength, for varying treatment times in (a) for respective thin films or coatings of P4VP-$CH_2I_2$ in the upper left panel, P4VP-$CH_3I$ in the middle left panel, and P4VP-$CH_2Br_2$ in the bottom left panel, and in panels (b) at right illustrates corresponding extinction coefficient spectra, according to some embodiments. As illustrated for the specified examples of the resulting films, the refractive index of the resulting film shown in the upper left panel treated for 8 hrs peaks at more than 2.2 and is at 2.0 or more in the 400-800 nm wavelength range. The resulting film shown in the middle left panel treated for 8 hrs has a refractive index that peaks at over 1.80 and is at or over 1.68 over the same wavelength range of 400-800 nm. The resulting film shown in the bottom left panel treated for 8 hrs has a refractive index that peaks at over 1.74 and is at or over 1.65 over the same wavelength range of 400-800 nm. As illustrated in panels (b) at right, the extinction coefficient of the illustrated resulting films is steady in the wavelength range of 650-800 nm and even 650-1690 nm and is less than 0.05 for the example of a resulting film of P4VP-$CH_2I_2$, less than 0.0001 for the examples of resulting films of P4VP-$CH_3I$ and P4VP-$CH_2Br_2$.

FIG. 4 illustrates refractive index spectra, refractive index vs. wavelength, for varying treatment times in (a) for respective thin films or coatings of $P4VP-CH_2I_2$ in the upper left panel, $P4VP-CH_3I$ in the middle left panel, and $P4VP-CH_2Br_2$ in the bottom left panel, and in panels (b) at right illustrates corresponding extinction coefficient spectra, according to some embodiments. Each panel shows curves for the respective illustrated halogenation treatment times. The maximum refractive index for $P4VP-CH_2I_2$ surpasses 2.06 at 632.8 nm. There is minimal absorption (extinction coefficient) in the wavelength range above 650 nm. P4VP- $CH_3I$ and $P4VP-CH_2Br_2$ attain maximum refractive indices of 1.71 and 1.67 at 632.8 nm, respectively, with negligible absorption in the visible wavelength range, in these examples.

Figure 5:
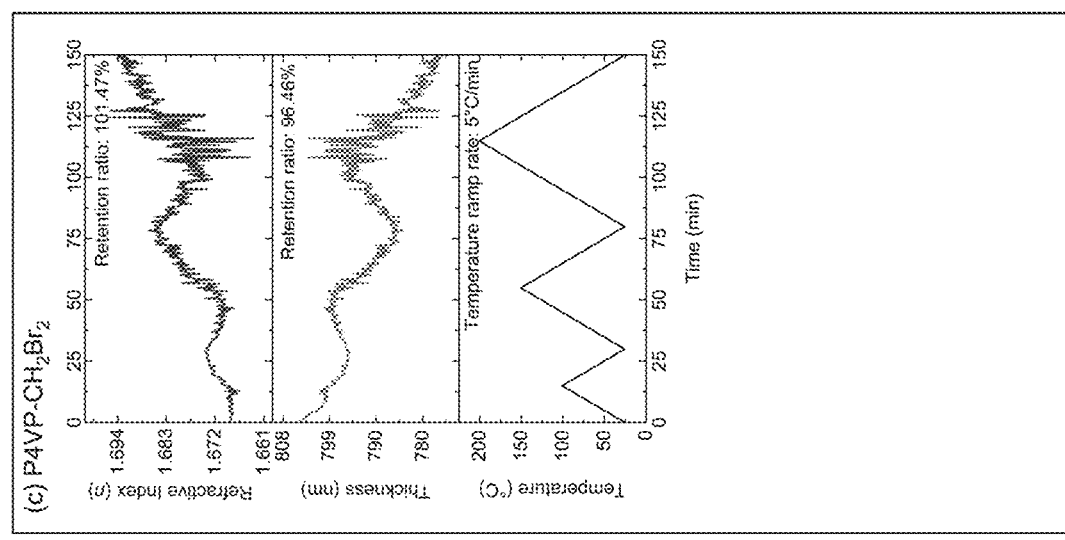
FIG. 5 illustrates thermal stability of thin films or coatings with the highest examples of refractive index of (a) P4VP-$CH_2I_2$, (b) P4VP-$CH_3I$, and (c) P4VP-$CH_2Br_2$, according to some embodiments.
Figure 5:
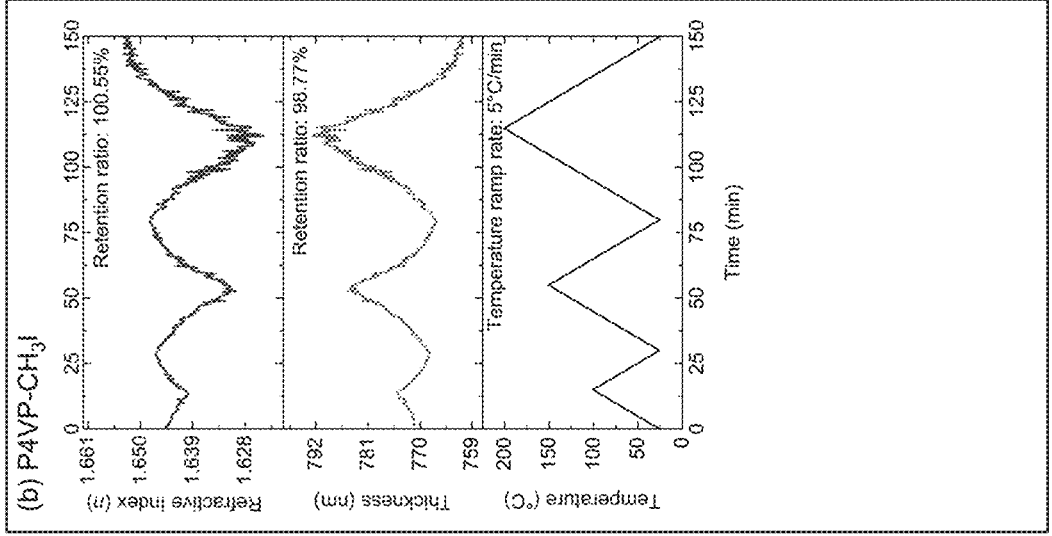
Figure 5:
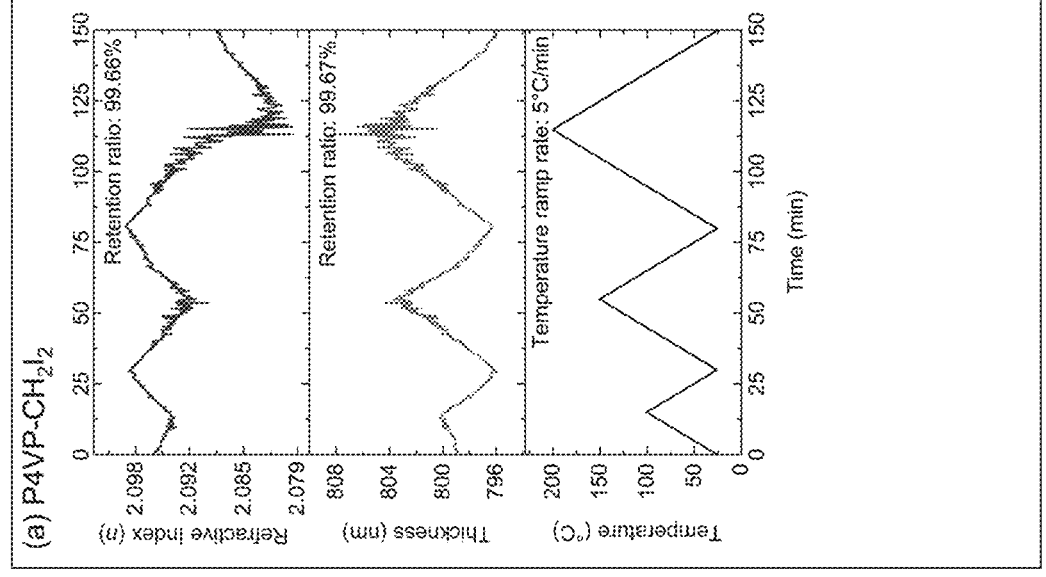

FIG. 5 illustrates thermal stability of thin films or coatings with the highest examples of refractive index of (a) $P4VP-CH_2I_2$, (b) $P4VP-CH_3I$, and (c) $P4VP-CH_2Br_2$, according to some embodiments described above. The films were subjected to three cycles of temperature ramp, starting at 25° C. and increasing to 100° C., 150° C., and 200° C., respectively, at a rate of 5° C./min. FIG. 5 shows that each of $P4VP-CH_2I_2$, $P4VP-CH_3I$, and $P4VP-CH_2Br_2$ has superior thermal stability, with high retention of thickness and refractive index after the thermal excursions, compared to pure P4VP and P4VP-12 reported in said parent patent application. As illustrated, the refractive index retention ratio in this example of $P4VP-CH_2I_2$ is 99.66% and the thickness retention ratio is 99.67% for the illustrated temperature steps. The refractive index retention ratio in this example of $P4VP-CH_3I$ is 100.55% and the thickness retention ratio is 98.77% for the illustrated temperature steps. The refractive index retention ratio in this example of $P4VP-CH_2Br_2$ is 101.47% and the thickness retention ratio is 96.46% for the illustrated temperature steps. Retention ratio as used in this patent specification refers to retention of refractive index after thermal excursion to 200° C.

Figure 6:
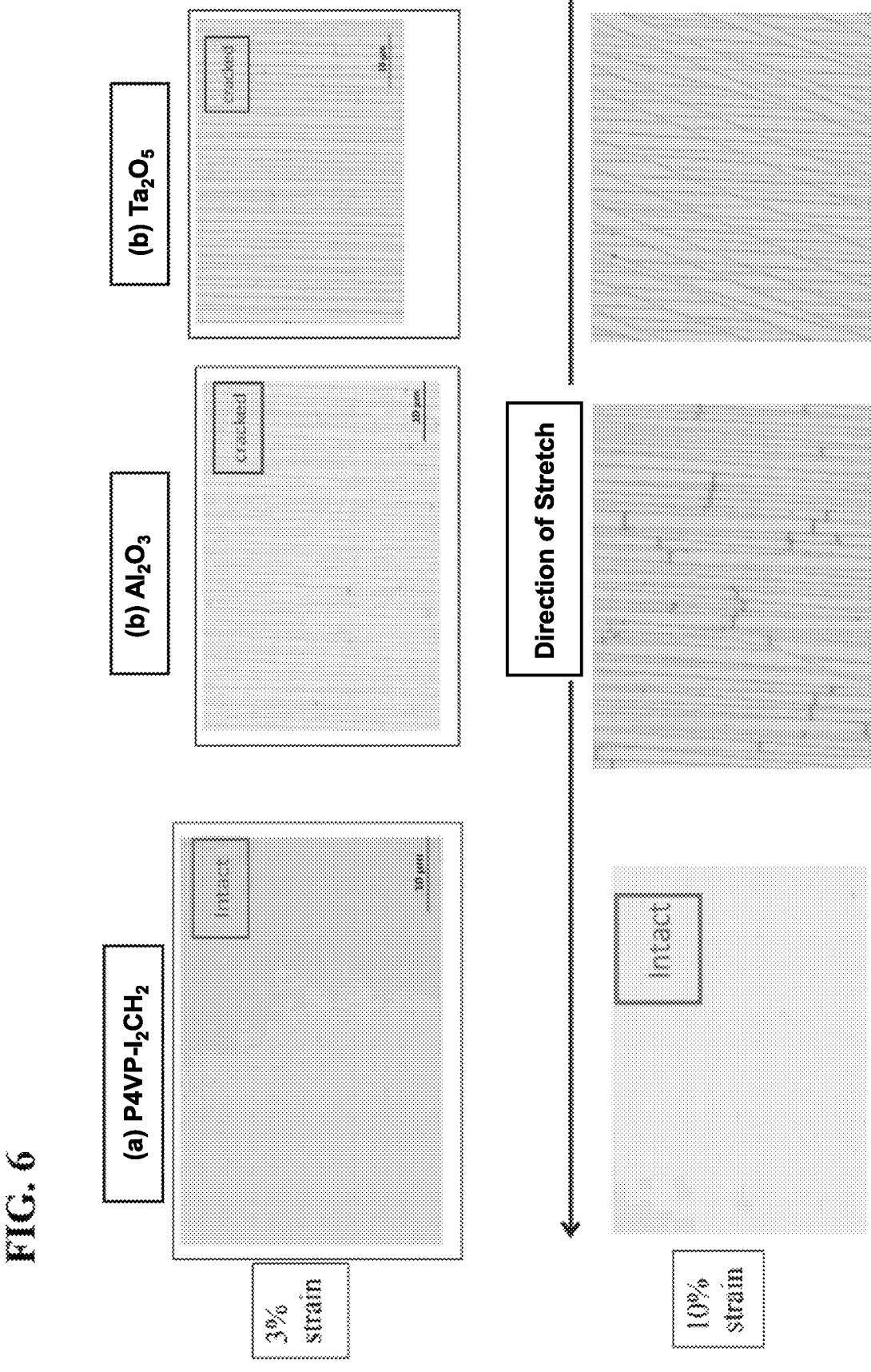
FIG. 6 shows microscope images of (a) P4VP-$CH_2I_2$, (b) $Al_2O_3$, and (c) $Ta_2O_5$ thin films at 100 nm thickness under 3% and 10% linear strain, respectively, according to some embodiments.

FIG. 6 shows microscope images of (a) $P4VP-CH_2I_2$, (b) $Al_2O_3$, and (c) $Ta_2O_5$ thin films at 100 nm thickness under 3% and 10% liner tensile strain, respectively, according to some embodiments described above. The scale bar is 10 μm for all images. $P4VP-CH_2I_2$ showcases enhanced flexibility and stretchability under 3% and 10% strain compared to $Al_2O_3$ and $Ta_2O_5$ thin films of equivalent thickness (100 nm). The direction of stretch is left-right.

Figure 7:
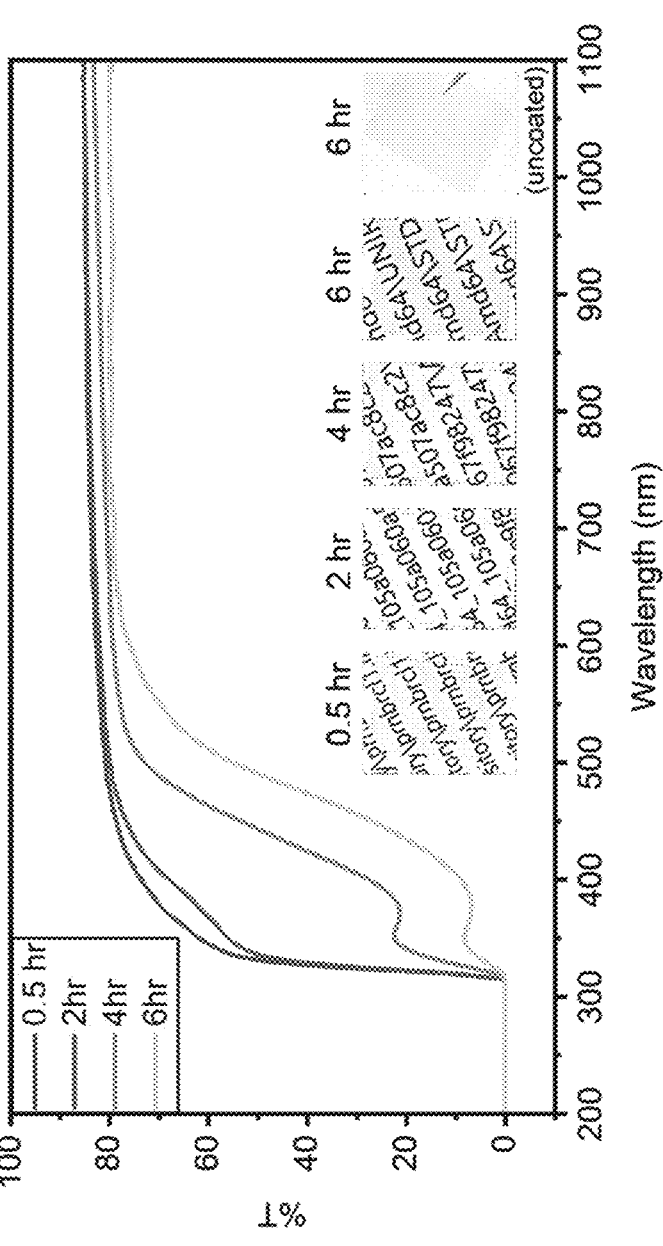
FIG. 7 illustrates optical transmittance and color change of 100 nm P4VP-$CH_2I_2$ thin films or coatings on a PET membrane after exposure to different durations of $CH_2I_2$ vapor treatment, according to some embodiments.

FIG. 7 illustrates optical transmittance in % and color change of 100 nm $P4VP-CH_2I_2$ thin films on a PET membrane after exposure to different durations of $CH_{212}$ vapor treatment, according to some embodiments described above. The images of text displayed in FIG. 7 depict 100 nm-thick $P4VP-CH_2I_2$ films coated onto Polyethylene terephthalate (PET) membranes. The films were exposed to $CH_2I_2$ vapor for varying lengths of time as indicated in FIG. 7. The first four images show a color change in the $P4VP-CH_2I_2$ films, indicating a reaction with the $CH_2I_2$ vapor. The final (rightmost) image displays an uncoated PET membrane treated with $CH_2I_2$ vapor, which did not change color, confirming that PET does not react with $CH_2I_2$. The transmission spectrum illustrates the optical transmittance of $P4VP-CH_2I_2$ samples. The color change observed in the images and the trend displayed in the transmission spectra both demonstrate that the iodine content in the films is directly proportional to the $CH_2I_2$ vapor treatment time.

Figure 8:
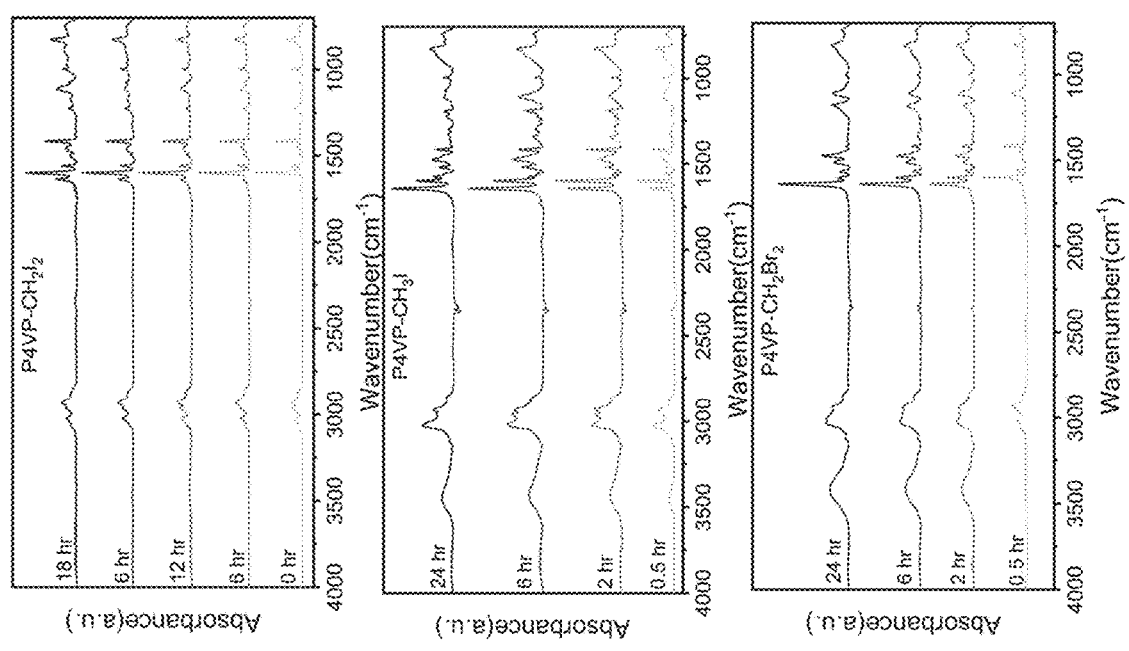
FIG. 8 shows full FTIR spectra of a series of P4VP-$CH_2I_2$, P4VP-$CH_3I$, and P4VP-$CH_2Br_2$ thin films with varying halogen vapor treatment times, which spectra correspond to the localized FTIR spectra of FIG. 3 but show the full range of the spectra rather than just a specific region, according to some embodiments.

FIG. 8 illustrates full FTIR spectra of a series of $P4VP-CH_2I_2$, $P4VP-CH_3I$, and $P4VP-CH_2Br_2$ thin films with varying halogen vapor treatment times, prepared according to some embodiments described above. These spectra correspond to the localized FTIR spectra displayed in FIG. 3 but show the full range of the spectra rather than just a specific region.

Figure 9:
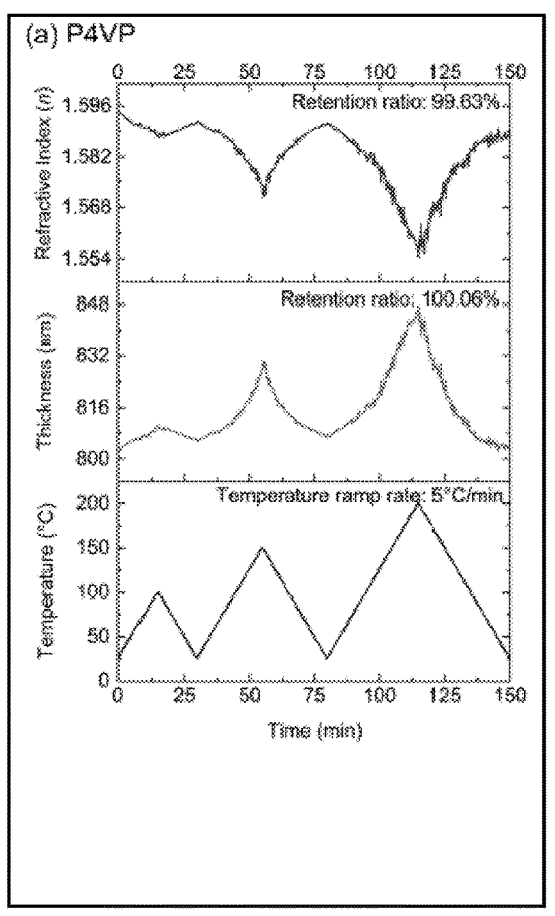
FIG. 9 illustrates thermal stability of thin films with the highest achievable refractive index: (a) P4VP, and (b) P4VP-$I_2$, subjected to three cycles of temperature ramp, starting at 25° C. and increasing to 100° C., 150° C., and 200° C., respectively, at a rate of 5° C./min, according to some embodiments.
Figure 9:
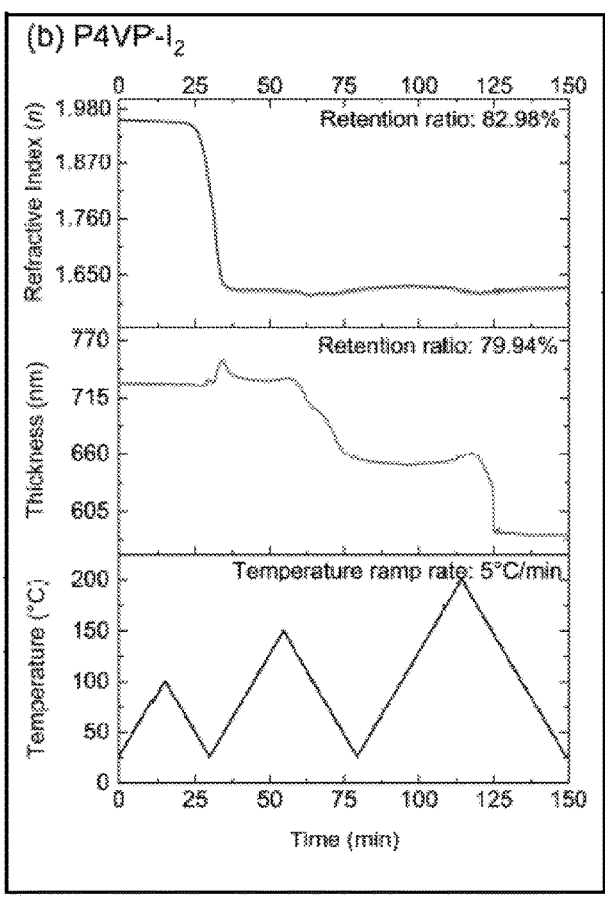

FIG. 9 illustrates thermal stability of thin films with the highest achievable refractive index: (a) P4VP, and (b) P4VP-12, prepared according to some embodiments. The films were subjected to three cycles of temperature ramp, starting at 25° C. and increasing to 100° C., 150° C., and 200° C., respectively, at a rate of 5° C./min.

Figure 10:
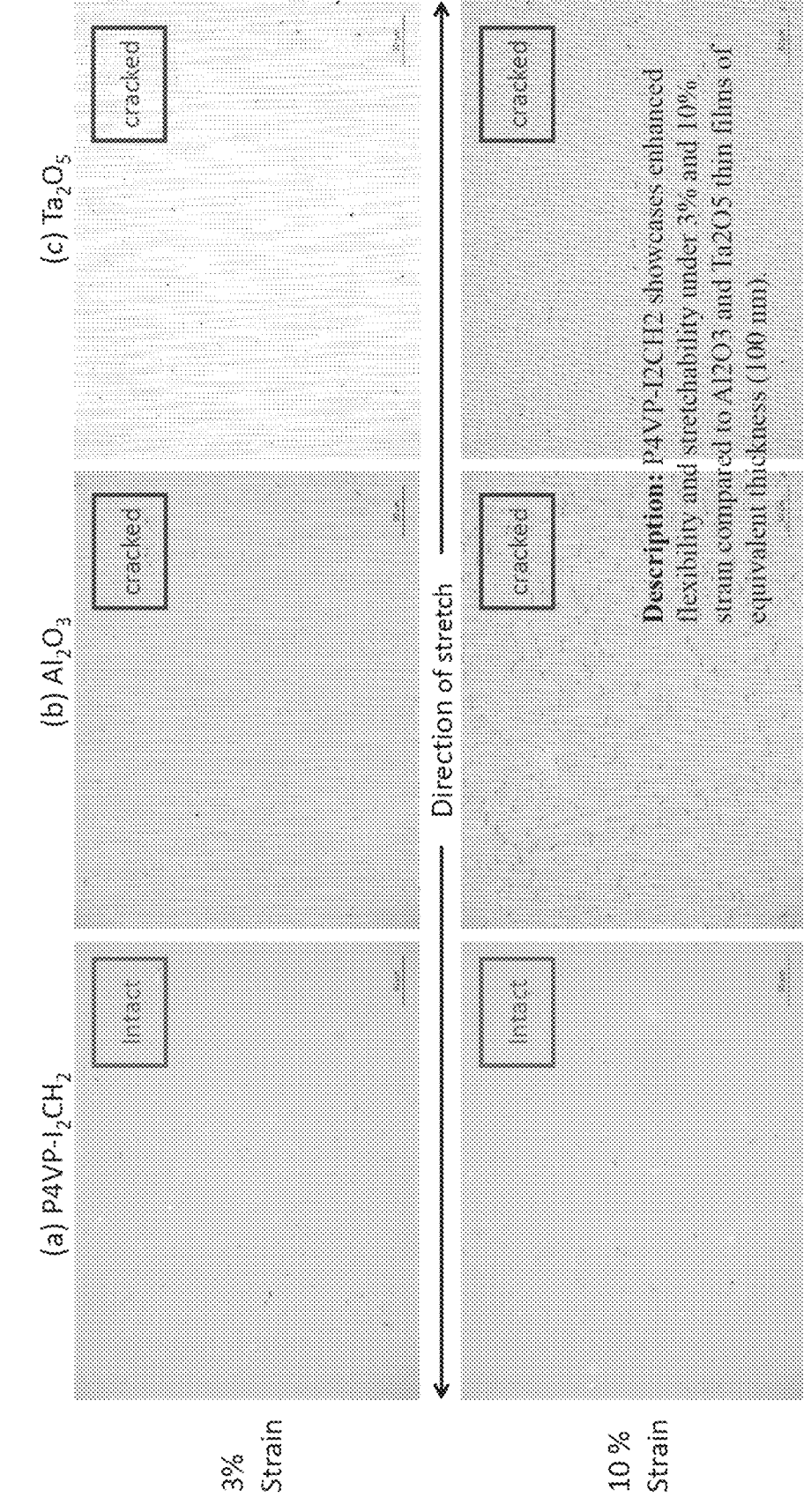
FIG. 10 illustrates P4VP-$CH_2I_2$ showcasing enhanced flexibility and stretchability under 3% and 10% strain compared to $Al_2O_3$ and $Ta_2O_5$ thin films of equivalent thickness (100 nm), according to some embodiments.

FIG. 10 shows microscope images of 100 nm thin films at 3% and 10% strain, respectively, prepared according to some embodiments described above. The images show (a) P4VP-CH$_2$I$_2$, (b) Al$_2$O$_3$, and (c) Ta$_2$O$_5$ thin films. These images correspond to the images in FIG. 6, but with a larger scale bar of 50 µm.

Figure 11:
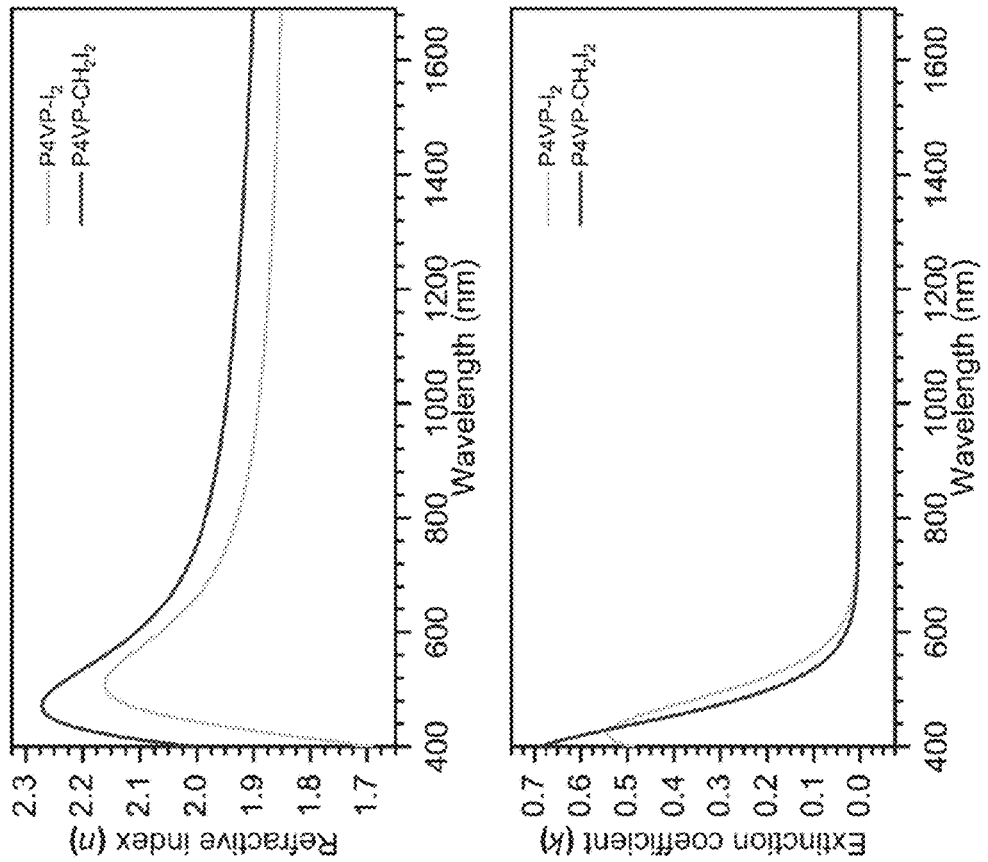
FIG. 11 shows that P4VP-$CH_2I_2$ demonstrates a higher maximum refractive index and reduced average absorption across the visible spectrum when compared to the P4VP-$I_2$ charge transfer complex (CTC), according to some embodiments.

FIG. 11 shows that P4VP-CH$_2$I$_2$ demonstrates a higher maximum refractive index and reduced average absorption across the visible spectrum when compared to the P4VP-12 charge transfer complex (CTC), according to some embodiments.

The parent patent application that is incorporated by reference herein describes other ways to form and halogenate polymers to improve desirable optical and other properties of the resulting film or coatings.

The proposed method to incorporate high molar refractivity halogens can also be applied to prepare alternative polymer systems using different halogenating agents and/or alternative polymer compositions and chemical structures. For example, besides poly(4-vinylpyridine) (P4VP), several other polymers can react with halomethane and dihalomethanes to form HRIPs. Notable examples include poly(2-vinylpyridine) (P2VP), poly(1-vinylimidazole), poly(vinyl pyrrolidone) (PVP), poly(vinylamine) (PVA), poly(ethyleneimine) (PEI), and poly(acrylamide) (PAAm). These polymers possess nitrogen-bearing functional groups that undergo substitution reactions with haloalkanes. Although, whether they result in useful HRIPS will depend on several factors, including the degree of reaction and stability of the formed chemical compounds.

Beyond the halomethane and dihalomethanes used in the experiments (CH$_2$I$_2$, CH$_2$Br$_2$, CH$_3$I), many other halogenating agents can react with polymers like P4VP and form stable compounds. Iodine and bromine-bearing haloalkanes and dihaloalkanes are expected to be the most practical given their high refractivity, but the reaction in principle could also be extended to other halocarbons, including chlorine-bearing species. (Fluorine is not of interest due its low polarizability/refractivity). The organic component of the halocarbon does not need to be methyl. Alkyl chains longer than methyl, including linear or branched structures, and aromatic groups may be useful. For example, ethyl halide (e.g. CH$_3$CH$_2$Br), butyl halide (e.g., CH$_3$CH$_2$CH$_2$CH$_2$Br), butyl dihalide (e.g. BrCH$_2$CH$_2$CH$_2$CH$_2$Br) can readily react to quaternize P4VP and other amines.

Other polymers possessing an amine functional group that then reacts with a haloalkane can be used in addition to those discussed above. Quaternary nitrogen groups are typically the final product of successive reactions of amines with halocarbons. Common quaternary nitrogen functional groups that can be incorporated into polymers include: ammonium, pyrrolidinium (sub-class of cyclic ammonium), imidazolium, pyridinium (P4VP is example of this), and guanidinium. In principle, sulfur- and phosphorous-bearing functional groups can be quaternized through reactions with halocarbons to generate sulfoniums and phosphoniums.

Thus, a film having a selected refractive index can be made by: first forming a layer comprising a polymer containing chemical moieties reactive toward haloalkanes or halocarbons; an thereafter quaternizing and halogenating the layer by introducing therein one or more halogenating agents that form a stable compound thereby resulting in a film that exhibits refractive index of 1.68 or more for wavelengths in the 400-800 nm range and film thickness in the 10-1000 nm range. The polymer can comprise one or more of poly(4-vinlypyridine) (P4VP), poly(2-vinylpyridine) (P2VP), poly(1-vinylimidazole), poly(vinyl pyrrolidone) (PVP), poly(vinylamine) (PVA), poly(ethyleneimine)

(PEI), poly(dimethylaminoethyl acrylate), poly(dimethylaminoethyl methacrylate), poly(acrylamide) (PAAm) and poly(methacrylamide), and copolymers thereof. The haloalkanes or alkyl halides can comprise one or more of bromoethane, bromobutane, dibromobutane, iodoethane, iodobutane, diiodobutane.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. A coating comprising:
   a polymer film formed of P4VP and thereafter quaternized and halogenated at elevated temperature with one or more of vaporized CH$_2$I$_2$, CH$_3$I, and CH$_2$Br$_2$ to form a resulting film of one or more of P4VP-CH$_2$I$_2$, P4VP-CH$_3$I, and P4VP-CH$_2$Br$_2$:
   wherein said resulting film:
   exhibits a refractive index of 1.65 or more for wavelengths in the 400-800 nm range; and
   has a thickness in the 10-2000 nm range.

2. The coating of claim 1, in which an extinction coefficient of the resulting film in the wavelength range of 650-800 nm is less than 0.05.

3. The coating of claim 1, in which an extinction coefficient of the resulting film in the wavelength range of 650-800 nm is less than 0.001.

4. The coating of claim 1, in which the refractive index of the resulting film is at 2.0 or more in the 400-800 nm wavelength range.

5. The coating of claim 1, in which the refractive index of the resulting film is at or over 1.68 over the wavelength range of 400-800 nm.

6. The coating of claim 1, in which the refractive index of the resulting film is at or over 1.7 over the wavelength range of 400-800 nm.

7. The coating of claim 1, in which the resulting film exhibits a refraction index retention ratio exceeding 99%.

8. The coating of claim 1, in which the resulting film exhibits a thickness retention ratio exceeding 99%.

9. The coating of claim 1, in which the resulting film exhibits a thickness retention ratio exceeding 97%.

10. The coating of claim 1, in which the resulting film exhibits a thickness retention ratio exceeding 96%.

11. The coating of claim 1, in which the resulting film thickness is in the range of 10-500 nm.

12. The coating of claim 1, in which the resulting film thickness is less than 200 nm.

13. The coating of claim 1, in which the resulting film exhibits improved flexibility and stretchability under 3% and 10% strain when compared to Al$_2$O$_3$ and Ta$_2$O$_5$ thin films of equivalent thickness.

14. A film having a selected refractive index, comprising:
   a base polymer with one or more of CH$_2$I$_2$, CH$_3$I, and CH$_2$Br$_2$ introduced into the base polymer to form the film with a thickness in the 10-1000 nm range and that exhibits a refractive index of 1.65 or more for wavelengths in the 400-800 nm range.

15. The film of claim 14, wherein an extinction coefficient of the film in the wavelength range of 650-800 nm is less than 0.05.

16. The film of claim 14, wherein an extinction coefficient in the wavelength range of 650-800 nm is less than 0.001.

17. The film of claim 14, wherein the refractive index of the film is at 2.0 or more in the 400-800 nm wavelength range.

18. The film of claim 14, wherein the refractive index of the film is at or over 1.68 over the wavelength range of 400-800 nm.

19. The film of claim 14, wherein the refractive index of the film is at or over 1.7 over the wavelength range of 400-800 nm.

20. The film of claim 14, wherein the film exhibits a refraction index retention ratio exceeding 99%.

21. The film of claim 14, wherein the film exhibits a thickness retention ratio exceeding 96%.

22. The film of claim 14, wherein the film thickness is in the range of 10-500 nm.

23. The film of claim 14, wherein the film exhibits improved flexibility and stretchability under 3% and 10% strain when compared to $Al_2O_3$ and $Ta_2O_5$ thin films of equivalent thickness.

24. The film of claim 14, wherein the base polymer comprises one or more of poly(4-vinylpyridine) (P4VP), poly(2-vinylpyridine) (P2VP), poly(1-vinylimidazole), poly (vinyl pyrrolidone) (PVP), poly(vinylamine) (PVA), poly (ethyleneimine) (PEI), poly(dimethylaminoethyl acrylate), poly(dimethylaminoethyl methacrylate), poly(acrylamide) (PAAm) and poly(methacrylamide), and copolymers thereof.

25. A film having a selected refractive index comprising:
a base polymer containing chemical moieties reactive toward halocarbons, the base polymer forming one or more covalent bonds with one or more halocarbons introduced therein to form a film with a thickness in the 10-1000 nm range and that exhibits a refractive index of 1.68 or more for wavelengths in the 400-800 nm range.

26. The film of claim 25, wherein the base polymer comprises one or more of poly(4-vinylpyridine) (P4VP), poly(2-vinylpyridine) (P2VP), poly(1-vinylimidazole), poly (vinyl pyrrolidone) (PVP), poly(vinylamine) (PVA), poly (ethyleneimine) (PEI), poly(dimethylaminoethyl acrylate), poly(dimethylaminoethyl methacrylate), poly(acrylamide) (PAAm) and poly(methacrylamide), and copolymers thereof.

27. The film of claim 25, wherein the one or more halogenating agents comprise haloalkanes.

28. The film of claim 27, wherein the haloalkanes comprise one or more of bromoethane, bromobutane, dibromobutane, iodoethane, iodobutane and diiodobutane.

29. The film of claim 25, wherein the one or more halogenating agents comprise halocarbons.

* * * * *